US005840375A

United States Patent [19]

Katsumi et al.

[11] Patent Number: 5,840,375

[45] Date of Patent: Nov. 24, 1998

[54] METHOD FOR THE PREPARATION OF A HIGHLY CORROSION RESISTANT RARE EARTH BASED PERMANENT MAGNET

[75] Inventors: Kenichi Katsumi; Takehisa Minowa; Masao Yoshikawa, all of Takefu, Japan

[73] Assignee: Shin-Etsu Chemical Co., Ltd., Tokyo, Japan

[21] Appl. No.: 661,877

[22] Filed: Jun. 12, 1996

[30] Foreign Application Priority Data

Jun. 22, 1995 [JP] Japan .................................... 7-156197
Jun. 22, 1995 [JP] Japan .................................... 7-156221
Aug. 29, 1995 [JP] Japan .................................... 7-220123

[51] Int. Cl.[6] ........................................................ B60B 1/00

[52] U.S. Cl. .......................... 427/600; 427/127; 427/193; 427/199; 427/204; 427/376.2

[58] Field of Search .................................... 427/127, 193, 427/204, 199, 376.2, 600

[56] References Cited

U.S. PATENT DOCUMENTS 4,983,231 1/1991 Yamanaka et al. ..................... 427/127

*Primary Examiner*—Bernard Pianalto
*Attorney, Agent, or Firm*—David E. Dougherty, Esquire

[57] ABSTRACT

A rare earth-based permanent magnet such as a neodymium-iron-boron permanent magnet, which is disadvantageous in respect of the low corrosion resistance, can be imparted with high corrosion resistance by providing the surface with a protective coating film of vitrified alkali metal silicate, e.g., sodium silicate, of which the $SiO_2$:(alkali metal oxide) molar ratio is in the range from 1.5 to 20. The vitrified alkali metal silicate-based protective coating film can be formed by coating the surface of the magnet with an aqueous coating solution containing sodium silicate to form a coating layer which is dried and subjected to a heat treatment at 50° to 450° C. to effect vitrification of the alkali metal silicate. The thickness of the thus formed protective coating film should be in the range from 5 nm to 10 $\mu$m. The protective effect of the vitrified sodium silicate-based coating film can be further improved by admixing the coating solution with finely divided silica particles of 5 to 50 nm average particle diameter.

9 Claims, No Drawings

METHOD FOR THE PREPARATION OF A HIGHLY CORROSION RESISTANT RARE EARTH BASED PERMANENT MAGNET

BACKGROUND OF THE INVENTION

The present invention relates to a method for the preparation of a highly corrosion-resistant rare earth-based permanent magnet or, more particularly, relates to a method for the preparation of a rare earth-based permanent magnet having high corrosion resistance as being provided with a specific protective coating film on the surface of a base magnet body as well as to a rare earth-based permanent magnet thus prepared.

As is well known, while various types of rare earth-based permanent magnets are now widely employed in the fields of electric and electronic technologies by virtue of their outstandingly high magnetic properties as compared with other kinds of permanent magnets along with the inexpensiveness thereof relative to the high magnetic performance, they are required in recent years to be more and more upgraded in view of the rapid progress in the electric and electronic instruments. Among the various types of rare earth-based permanent magnets, those belonging to the most promising class are the rare earth-iron-boron magnets and, since the rare earth element contained in the magnets of this type is mainly neodymium, they are much superior in the magnetic properties to the cobalt-samarium magnets proposed in the early stage of development of the rare earth-based permanent magnets despite their much lower costs for the base materials than the cobalt-samarium magnets because neodymium is much more abundant in nature than samarium and expensive cobalt metal is, if used, not required in large quantities. Accordingly, these rare earth-iron-boron magnets are replacing or rather have replaced the samarium cobalt magnets at least in compact magnetic circuits and they are now entering the fields where hard ferrite magnets or electromagnets are employed traditionally.

The rare earth-iron-boron magnets, however, are not without problems and disadvantages. As an inherence of the rare earth element and iron as the principal constituents therein, namely, they are readily oxidized within a short time in air, in particular, containing moisture so that various troubles are encountered with these permanent magnets due to formation of an oxidized surface film when they are built in a magnetic circuit such as a decrease in the output of the magnetic circuit or contamination of the instruments therearound.

Various attempts and proposals have been made heretofore with an object to improve the corrosion resistance of rare earth-iron-boron permanent magnets including coating methods with a resin-based coating composition and surface treatment methods such as vapor-phase plating, e.g., ion plating, and wet-process plating, e.g., nickel plating. These prior art methods for coating and surface treatment of the permanent magnets, however, are not practicable for the rare earth-iron-boron magnets in respect of the high costs therefor as a consequence of the complicacy of the process.

As a more convenient and less expensive method for the improvement of corrosion resistance of rare earth-iron-boron magnets, Japanese Patent Kokai 6-302420 proposes a method in which a rare earth-iron-boron magnet is subjected to a chromic acid treatment. This method, however, cannot be satisfactorily inexpensive because the chromic acid treatment must be preceded by a pickling treatment with an inorganic acid such as nitric acid and disposal of wastes of the chromic acid solution requires a large cost in order not to cause a serious problem of environmental pollution.

SUMMARY OF THE INVENTION

The present invention accordingly has an object to provide a novel and improved method for the improvement of the corrosion resistance of a rare earth-based permanent magnet or, in particular, a rare earth-iron-boron permanent magnet with outstanding reliableness and inexpensiveness as compared with the above described prior art methods.

Thus, the method of the present invention for the preparation of a highly corrosion-resistant rare earth-iron-boron permanent magnet comprises the steps of:

(a) coating the surface of a base body of the permanent magnet with an aqueous coating liquid containing an alkali silicate having a chemical composition expressed by the formula $M_2O.nSiO_2$, in which M is an alkali metal element or, in particular, element of sodium and n is a positive number in the range from 1.5 to 20 or, preferably, in the range from 2.5 to 9.0, to form a coating layer;

(b) drying the coating layer to give a dried surface film; and (c) subjecting the dried surface film of alkali metal silicate to a heat treatment at a temperature in the range from 50° to 450° C. or, preferably, in the range from 120° to 450° C. to form a vitrified alkali silicate-based coating film, the coating amount in step (a) with the aqueous coating liquid being such that the vitrified alkali silicate-based coating film formed in step (c) has a thickness in the range from 5 nm to 10 $\mu$m.

Although the above defined method is effective to form a protective film on the surface of the base body of a permanent magnet, the adhesion between the protective coating film and the surface of the magnet base body can further be enhanced by admixing the aqueous coating liquid containing an alkali silicate used in step (a) with finely divided silica particles having an average particle diameter in the range from 5 nm to 50 nm in an amount in the range from 2% to 50% by weight based on the amount of silicon dioxide contained in the aqueous coating liquid as an alkali silicate.

DETAILED DESCRIPTION OF THE PREFERRED EMBODIMENTS

As is described above, the most characteristic feature of the inventive method consists in the formation of an alkali silicate-based vitrified protective coating film on the surface of a rare earth-iron-boron permanent magnet. Namely, the method of the present invention is particularly useful for a rare earth-based permanent magnet of the rare earth-iron-boron type, of which the rare earth element can be any one or any combination of the elements including yttrium and the elements having an atomic number in the range from 57 to 71 inclusive. In particular, the method of the invention is quite successfully applicable to those rare earth-iron-boron permanent magnets of which the rare earth element includes one or more of the elements selected from the group consisting of cerium, lanthanum, neodymium, dysprosium and terbium. Though not particularly limitative, the magnetic alloy forming the base body of the rare earth-iron-boron permanent magnet comprises from 5 to 40% by weight of the rare earth element or elements, from 50 to 90% by weight of iron and from 0.2 to 8% by weight of boron. The temperature characteristics of the permanent magnet of this type can be improved by replacing a part of iron with cobalt in such an amount of from 0.1 to 15% by weight of the magnetic alloy as a whole. The amount of cobalt should not be too high because of a possible decrease in the coercive force of the permanent magnet. In addition, several kinds of other alloying elements can be added to the magnet alloy each in a limited amount with an object to improve some particular properties or to decrease the material costs including the elements selected from the group consisting of nickel, niobium, aluminum, titanium, zirconium, chromium, vanadium, manganese, molybdenum, silicon, tin, copper, calcium, magnesium, lead, antimony, gallium and zinc. The process for the preparation of a rare earth-iron-boron magnet from these alloying elements by the powder metallurgical method is well known and established in the art.

In step (a) of the inventive method, a base body of the rare earth-iron-boron permanent magnet is coated with an aqueous coating liquid containing an alkali silicate. Examples of the alkali silicate useful in the inventive method include sodium silicate, potassium silicate and lithium silicate, of which sodium silicate is preferred in respect of the inexpensiveness. So-called water glass as a commercial product, of which the silicon dioxide to sodium oxide molar ratio, i.e. $SiO_2$:$Na_2O$, is usually in the range from 2 to 4, can be used as such as a form of sodium silicate. When water glass is used as the alkali silicate material, it is preferable to select water glass having the molar ratio of $SiO_2$:$Na_2O$ not smaller than 2.5.

Since it is essential that the protective coating film on the magnet surface formed in step (c) has a specific thickness, it is advantageous from the standpoint of working efficiency that the aqueous coating liquid contains the alkali silicate in an appropriate concentration of, for example, 3 to 200 g/liter calculated as silicon dioxide in order to enable obtaining a desired thickness of the protective vitrified film without repeating the coating work. The concentration of the aqueous coating liquid can readily be adjusted by suitably selecting the amount of deionized water to dissolve the alkali silicate, e.g., water glass. When the concentration thereof is too low, a protective coating film having an adequate thickness cannot be obtained by a single coating work while, when the concentration thereof is too high, the viscosity of the coating liquid is too high so that a decrease is caused in the uniformity of the protective coating film with poor appearance.

The vitrified alkali silicate-based protective coating film formed on the surface of the permanent magnet body should have a thickness in the range from 5 nm to 10 μm or, preferably, in the range from 100 nm to 3 μm. An appropriate thickness of the protective coating film can readily be obtained by properly selecting the concentration of the alkali silicate in the aqueous coating liquid although it is a possible way that the coating work with a somewhat diluted coating liquid is repeated until the thickness of the coating film reaches a desired value. When the thickness of the protective coating film is too small, no full protective effect against corrosion can be obtained even on the surface of a permanent mag-net having only extremely fine microscopic ruggedness while, when the thickness of the protective coating film is too large, difficulties are encountered in accomplishing full uniformity of the coating film with good appearance even though no adverse effects are caused on the protective effect of the coating film. When the size of the permanent magnet body to be protected is very small, an additional disadvantage is caused with a coating film of too large thickness due to the difference between the overall volume of the coated permanent magnet and the net volume of the permanent magnet excluding the coating film. In order to obtain the above mentioned thickness of the vitrified alkali silicate-based coating film by a single coating work, the concentration of the alkali silicate in the aqueous coating liquid should be in the range from 3 g/liter to 200 g/liter calculated as $SiO_2$ depending on the desired thickness of the coating film.

The procedure for coating of a permanent magnet with the alkali silicate-containing coating liquid in step (a) of the inventive method can be performed by any known method including brush coating, spray coating, dip coating and so on depending on the size and shape of the permanent magnet body as well as the viscosity of the coating liquid and desired thickness of the protective coating film. The coating layer of the coating liquid formed on the surface of the permanent magnet body is dried in step (b) of the inventive method in a conventional procedure either at room temperature or at an elevated temperature.

In step (c) of the inventive method, the alkali silicate-based coating film on the surface of a permanent magnet body is subjected to a heat treatment under specified conditions with an object to complete drying of the coating liquid and vitrification of the alkali silicate-based coating film into a vitrified form by the dehydrating condensation reaction between the silanolic hydroxy groups of the alkali silicate. The heat treatment is conducted at a temperature in the range from 50° to 450° C. or, preferably, from 120° to 450° C. for a length of time in the range from 1 to 120 minutes depending on the temperature of the heat treatment. When the temperature is too low, vitrification of the coating film by the silanol condensation reaction cannot be complete even with an undue extension of the treatment time to cause a decrease in the productivity. Similarly, the vitrification of the coating film is incomplete when the treatment time is too short. When the temperature of the heat treatment is too high to exceed 450° C., an adverse influence is caused on the magnetic properties of the permanent magnet. A too long time of the heat treatment has no particularly adverse influences provided that the temperature is not too high besides a decrease in the productivity.

Though not essential, it is desirable that the coating work of the surface of the permanent magnet body in step (a) with an alkali silicate-containing aqueous coating liquid is preceded by a cleaning treatment, for example, by way of application of ultrasonic waves in order to remove any small number of particulate materials on the surface of the magnet body such as machining debris and magnetic particles deposited by physical adsorption or magnetic attraction since otherwise the particulate materials greatly disturbs and decrease the cohesive adhesion of the vitrified protective coating film to the surface of the permanent magnet body resulting in a great decrease in the corrosion resistance of the coated permanent magnet.

In the above, description is given solely for the use of a commercial product of water glass as a form of sodium silicate, of which the $SiO_2$:$Na_2O$ molar ratio is usually in the range from 2 to 4. The inventive method, however, is more versatile in respect of the chemical composition of the alkali silicate relative to the silicon dioxide to alkali oxide molar ratio $SiO_2$:$M_2O$, in which M is an alkali metal element such as sodium, potassium and lithium, referred to hereinafter as the Si:alkali ratio. Namely, the Si:alkali ratio in the alkali silicate-containing aqueous coating liquid can range as broadly as in the range from 1.5 to 20.0. Although an alkali silicate having such a value of the Si:alkali ratio can not always be obtained as a commercial product, the Si:alkali ratio of a commercial alkali silicate product can be increased by an ion-exchange treatment with a cation exchange resin to replace the alkali metal ions with hydrogen ions or can be decreased by the admixture of the alkali silicate-containing coating liquid with an aqueous solution of a corresponding alkali hydroxide.

When the Si:alkali ratio is too low in the vitrified protective film on the surface of the magnet body, the coating film is so rich in the alkali metal ions that the water resistance of the coating film is decreased not to exhibit a high protective effect of corrosion resistance, especially, in a high-humidity atmosphere. In addition, the alkali metal ions after reaction with water or moisture further react with carbon dioxide in the atmosphere to form an alkali carbonate like a phenomenon of efflorescence on the surface of the protective coating film with eventual contamination of the instruments around the magnet. Moreover, a protective coating film having a low Si:alkali ratio may cause a trouble relative to the adhesive bonding of the coated permanent magnet mounted on an instrument to build up a magnetic circuit by means of an epoxy resin-based or acrylic resin-based adhesive because these adhesives are subject to degradation by strong alkalinity in the prolonged use of the instrument with the permanent magnet built therein.

When an alkali silicate-containing aqueous coating liquid, of which the Si:alkali ratio is too high, is used for the formation of a vitrified alkali silicate-based protective coating film, the alkali silicate forming the coating layer is so rich in the content of silanolic hydroxy groups that shrinkage of the coating layer by the silanol dehydration condensation reaction in step (c) proceeds excessively resulting in formation of microscopic cracks and fissures in the vitrified protective coating film consequently to decrease the effectiveness of corrosion resistance. Besides, the vitrified protective coating film with such a high Si:alkali ratio is subject to the occurrence of the phenomenon of whitening to decrease the aesthetic value of the appearance of the coated magnet as a commercial product. It is of course that, in addition, an alkali silicate-containing aqueous coating liquid, of which the Si:alkali ratio is too high, is unstable to cause premature gelation as a consequence of the dehydration condensation reaction between the silanolic hydroxy groups contained in a high content.

Besides the above described modification of the Si:alkali ratio in the vitrified protective coating film, it has been unexpectedly discovered that a substantial improvement can be obtained by the admixture of the alkali silicate-containing aqueous coating liquid with finely divided silicon dioxide particles having an average particle diameter in the range from 5 nm to 50 nm in a specified amount. Various grades of commercial products are available on the market for such a finely divided silica powder including Aerosils (products by Nippon Aerosil Co.), Snowtexes (products by Nissan Chemical Co.) and the like. These finely divided silica particles have silanolic hydroxy groups on the surface in an amount of 1 to 15% by moles based on the silicon dioxide. Aerosils are particularly preferable, although finely divided silica particles prepared by a wet process from sodium silicate or an alkoxide compound of silicon such as silicon tetraethoxide can also be used, because, as a product obtained by the flame hydrolysis of a vaporizable silicon compound, Aerosils are almost free from an impurity of any alkali metal element or sodium so that the powder can be dispersed in the aqueous coating liquid without affecting the Si:alkali ratio of the coating liquid.

The amount of the finely divided silica particles added to and dispersed in the alkali silicate-containing aqueous coating liquid is in the range from 2% to 50% by moles of the $SiO_2$ content in the alkali silicate. The uniformity of the dispersion of the silica particles in the coating liquid can be increased by the application of ultrasonic waves to the aqueous liquid admixed with the silica particles. It is presumable that a co-condensation reaction by dehydration proceeds in the coating film between the silanolic hydroxy groups on the surface of the silica particles and the hydroxy groups in the alkali silicate forming a siloxane linkage so as to integrate the silica particles into the structure of the vitrified alkali silicate-based coating film exhibiting a reinforcing effect on the mechanical properties of the coating film. Since no alkali ions are present around the fine silica particles in the vitrified protective film and the corrosive effect of the atmospheric moisture is exhibited by the reaction of the water molecules with alkali metal ions to form an alkali hydroxide, the vitrified protective film containing finely divided silica particles uniformly dispersed therein is imparted with increased resistance against moisture as compared with the protective films formed from an alkali silicate-containing coating liquid without admixture of finely divided silica particles.

As is mentioned above, the amount of the finely divided silica particles added to the alkali silicate-containing coating liquid, when added, is in the range from 2% to 50% by moles or, preferably, from 5% to 35% by moles based on the $SiO_2$ content of the alkali silicate contained in the coating liquid. When the amount of the silica particles is too small, the above described advantageous effect cannot be fully obtained as a matter of course due to the deficiency in the number of silica particles incorporated into the coating film in addition to the disadvantages similar to those caused by the use of an alkali silicate of which the Si:alkali ratio is too low. When the amount of the silica particles is too large, on the other hand, the shrinkage of the coating film in the heat treatment as the step (c) by the silanol condensation proceeds excessively so that the protective coating film after the heat treatment sometimes suffers from occurrence of cracks not to exhibit high corrosion resistance in addition to the problems of a decrease in the uniformity of the coating layer due to the unduly increased slurry-like consistency of the coating liquid and a decrease in the stability of the dispersion of the silica particles even by the application of ultrasonic waves to promote dispersion of the particles.

The conditions of the heat treatment in step (c) of the inventive method, when the coating liquid contains finely divided silica particles as is described above, can be identical with those without addition of silica particles to the coating liquid.

As is mentioned before, it is preferable that step (a) for coating of the surface of a permanent magnet body is preceded by a cleaning treatment, preferably, with application of ultrasonic waves. This cleaning treatment, however, can be much simpler than in the cleaning treatment as a pre-treatment for conventional coating methods. Namely, conventional coating procedures for coating of rare earth-based permanent magnets, such as wet-process plating of nickel and the like and chemical-forming treatment with zinc phosphate, require very elaborate cleaning pre-treatments including degreasing to remove any greasy contaminants, acid pickling to remove an oxidized surface film which is insusceptible to the adhesion of the protective coating film, activation treatment to increase reliableness of adhesion between the magnet surface and the coating film and to improve reliableness of corrosion resistance, and so on while these complicated pre-treatments need not be undertaken in the inventive method to greatly decrease the overall costs for the treatment. This is because, different from conventional protective coating films, the vitrified alkali silicate-based protective film can firmly adhere even to the oxidized surface of a rare earth-based permanent magnet and no chemical reaction is involved in the formation of the protective film on the magnet surface.

In the following, the method of the present invention is illustrated in more detail by way of Examples and Comparative Examples.

EXAMPLES 1 TO 7 AND COMPARATIVE EXAMPLES 1 TO 3

An ingot of a rare earth-based magnet alloy, which consisted of 32.0% by weight of neodymium, 1.2% by weight of boron, 59.8% by weight of iron and 7.0% by weight of cobalt, was prepared by melting the respective elementary materials in a high-frequency induction furnace under an atmosphere of argon followed by casting the melt into a mold. The ingot was crushed in a jaw crusher and then finely pulverized in a jet mill with nitrogen gas as the jet gas to give fine particles of the alloy having an average particle diameter of 3.5 μm. The alloy powder was subjected to in-field molding in a metal mold in a magnetic field of 10 kOe under a compressive force of 1000 kgf/cm$^2$ to give a block which was subjected to sintering in a vacuum furnace at 1100° C. for 2 hours followed by an aging treatment at 550° C. for 1 hour to give a permanent magnet body.

Test pieces of permanent magnet, each having a diameter of 21 mm and a thickness of 5 mm, were prepared by cutting the above obtained magnet body followed by barrel polishing of the surfaces. The test pieces were subjected to a pre-treatment of ultrasonic cleaning in deionized water and dried. The direction of easy magnetization coincided with the direction of thickness of the test piece.

Separately, sodium silicate-containing aqueous coating solutions were prepared by dissolving water glass, of which the molar ratio of $SiO_2$:$Na_2O$ was 3.1, in deionized water in concentrations ranging from 1 g/liter to 250 g/liter calculated as $SiO_2$. Each of the pellet-formed test pieces, excepting for Comparative Example 3 undertaken without the coating treatment for the purpose of control, was subjected to a single coating treatment by dipping in and pulling out from one of these coating liquids followed by a heat treatment in a hot-air oven at 150° C. for 20 minutes to form a vitrified sodium silicate-based coating film on the surface, of which the thickness was determined by the XPS (X-ray photoelectron spectroscopy) method, when the thickness was smaller than 1 μm, or by using a micrometer, when the thickness was 1 μm or larger, to give the values shown in Table 1 below. The above mentioned coating treatment was repeated three times in Example 7 by using a coating solution of sodium silicate in a concentration of 200 g/liter calculated as $SiO_2$ with an object to obtain a large thickness of the coating film. The film thickness in Comparative Example 2, in which the aqueous coating solution of sodium silicate had a concentration of 250 g/liter calculated as $SiO_2$, was not uniform so that no accurate value of the thickness could be obtained.

The thus prepared test specimens were each subjected to a pressure-cooker test in which the test specimen was kept for 100 hours in a saturated water vapor at 120° C. followed by thorough scraping off of any rusty materials on the surface to measure the weight decrease in mg per cm$^2$ to give the results shown in Table 1. Further, the test specimens were subjected to an accelerated weatherability test by keeping for 100 hours in an atmosphere of 90% relative humidity at 80° C. and the outer appearance thereof was visually inspected to record the results as shown in Table 1 in three ratings of A, B and C according to the following criteria.

A: no changes detected

B: rust spots detected

C: rust detected on all over the surface

TABLE 1

| | Thickness of film, nm | Weight decrease, mg/cm$^2$, in pressure-cooker test | Appearance after weatherability test |
|---|---|---|---|
| Example | | | |
| 1 | 5 | 1.34 | B |
| 2 | 10 | 0.93 | B |
| 3 | 90 | 0.60 | A |
| 4 | 200 | 0.40 | A |
| 5 | 1300 | 0.39 | A |
| 6 | 3000 | 0.39 | A |
| 7 | 10000 | 0.38 | A |
| Comparative Example | | | |
| 1 | <1 | 2.6 | C |
| 3 | 0 | 3.0 | C |

EXAMPLES 8 TO 13 AND COMPARATIVE EXAMPLE 4

Test pieces of the rare earth-based permanent magnet having the same dimensions as in the preceding Examples were prepared also in the same manner as before. After an ultrasonic cleaning treatment in acetone, each of the test pieces was subjected to a single dip-coating treatment with an aqueous solution of the same water glass used in the preceding Examples in a concentration of 40 g/liter calculated as $SiO_2$ followed by a heat treatment at varied temperatures of 50° to 500° C. as shown in Table 2 below for 20 minutes to form a vitrified sodium silicate-based protective film on the surface, which had a thickness of 200 nm as determined by the XPS method.

The thus coated test specimens of permanent magnet were subjected to the pressure-cooker test and accelerated weatherability test under the same testing conditions as in the preceding Examples to give the results shown in Table 2. Further, test specimens provided with the vitrified sodium silicate-based protective coating film were subjected to an evaluation test of the magnetic performance in the coil draw-out method by the measurement of the electromotive force with a flux meter and the value in maxwell-turn was compared with the value before the coating treatment to calculate the decrease in % to give the results shown in Table 2.

TABLE 2

| | Temperature of heat treatment, °C. | Weight decrease, mg/cm$^2$, in pressure-cooker test | Appearance after weatherability test | Decrease in magnetic property, % |
|---|---|---|---|---|
| Example | | | | |
| 8 | 50 | 0.75 | B | 0.5 |
| 9 | 80 | 0.50 | A | 0.6 |
| 10 | 120 | 0.41 | A | 0.8 |
| 11 | 200 | 0.38 | A | 0.8 |
| 12 | 300 | 0.35 | A | 0.8 |
| 13 | 450 | 0.32 | A | 1.2 |
| Comparative Example | | | | |
| 4 | 500 | 0.32 | A | 7.8 |

EXAMPLES 14 TO 16

The test specimen used in Example 14 was the same one as prepared in Example 4. The test specimen in Example 15 was prepared also in the same manner as in Example 4 except that the ultrasonic cleaning treatment in deionized water was preceded by immersion of the magnet body in a 3% by volume aqueous nitric acid solution for 30 seconds at room temperature. The test specimen in Example 16 was prepared also in the same manner as in Example 4 excepting omission of any pre-treatment for cleaning.

Besides the pressure-cooker test undertaken in the same manner as in the preceding Examples to give values of weight decrease of 0.40, 0.42 and 0.92 mg/cm$^2$ in Examples 14, 15 and 16, respectively, each of the thus coated test specimens was subjected to the test for the adhesive bonding strength of the vitrified sodium silicate-based protective coating film to the substrate surface by the measurement of the shearing force required for the removal of an iron panel adhesively bonded to the protective coating film by using an epoxy resin-based adhesive to give values of 410, 340 and 260 kgf/cm$^2$ in Examples 14, 15 and 16, respectively.

EXAMPLES 17 TO 22 AND COMPARATIVE EXAMPLES 5 AND 6

Test specimens of rare earth-based permanent magnet were prepared in the same manner as in Examples 1 to 7 except that the sodium silicate-containing coating solutions had different values of the $SiO_2$:$Na_2O$ molar ratio ranging from 1.0 to 25.0 as prepared by the treatment of a starting water glass solution having a $SiO_2$: $Na_2O$ molar ratio of 2.4 in a concentration of 30 g/liter as calculated for $SiO_2$ with a cation exchange resin, when the target value of the $SiO_2$:$Na_2O$ molar ratio was higher than 2.4, or by the addition of an aqueous sodium hydroxide solution, when the target value of the $SiO_2$:$Na_2O$ molar ratio was lower than 2.4, as is shown in Table 3 below. The vitrified sodium silicate-based protective coating films thus formed had a thickness of about 150 nm.

Each of the thus prepared test specimens was subjected to the accelerated weatherability test under the same conditions as in the preceding Examples to give the results shown in Table 3 below, in which the notation of W means appearance of whitening on the surface. Further, the test specimen was adhesively bonded to an iron panel by using an epoxy resin-based adhesive and the assemblage of the test specimen and the iron panel was subjected to the same accelerated weatherability test to determine the decrease in % in the adhesive bonding strength as compared with the value before the accelerated weatherability test to give the results in % as shown in Table 3.

TABLE 3

| | $SiO_2$:$Na_2O$ molar ratio | Appearance after weatherability test | Decrease in adhesive bonding, % |
|---|---|---|---|
| Example | | | |
| 17 | 1.5 | B,W | 48.8 |
| 18 | 2.0 | W | 37.8 |
| 19 | 3.0 | A | 15.5 |
| 20 | 7.0 | A | 10.3 |
| 21 | 9.0 | A | 10.2 |
| 22 | 20.0 | B | 18.3 |
| Comparative Example | | | |
| 5 | 1.0 | B,W | 63.5 |
| 6 | 25.0 | C | 38.4 |

As is understood from the above given data, good resistance of the protective coating film against weathering can be obtained when the molar ratio of $SiO_2$:$Na_2O$ is in the range from 1.5 to 20 or, preferably, from 3.0 to 9.0 and the adhesive bonding of the protective coating film to the substrate surface is also highly resistant against weathering when the molar ratio is in the range from 3.0 to 20.

EXAMPLE 23 TO 27 AND COMPARATIVE EXAMPLES 7 AND 8

The experimental procedure was substantially the same as in Examples 1 to 7 except that the aqueous coating solutions containing sodium silicate having a $SiO_2$:$Na_2O$ molar ratio of 3.1 were replaced with aqueous solutions of lithium silicate having a $SiO_2$:$Li_2O$ molar ratio of 4.0 in varied concentrations of 1 to 250 g/liter calculated as $SiO_2$. The coating treatment was conducted once in each of Examples 23 to 26 and Comparative Examples 7 and 8 while the coating treatment in Example 27 was conducted twice with a coating solution containing 200 g/liter of lithium silicate calculated as $SiO_2$. The coating film in Comparative Example 8 by using a coating solution containing 250 g/liter of lithium silicate calculated as $SiO_2$ was not uniform.

The thus prepared test specimens were subjected to the accelerated weatherability test under the same conditions as in the preceding examples to give the results shown in Table 4 below, which also gives the thickness of the vitrified lithium silicate-based protective coating films. As is understood from the table, good weatherability of the permanent magnet can be obtained when the thickness of the protective coating film is 5 μm or larger although no uniform coating film could be obtained in Comparative Example 8 by using a coating solution of lithium silicate in a concentration of 250 g/liter calculated as $SiO^2$.

TABLE 4

| | Thickness of protective coating film, nm | Appearance after weatherability test |
|---|---|---|
| Example | | |
| 23 | 5 | B |
| 24 | 200 | A |
| 25 | 1500 | A |
| 24 | 4000 | A |
| 25 | 10000 | A |
| Comparative Example | | |
| 7 | <1 | C |

EXAMPLES 28 TO 31 AND COMPARATIVE EXAMPLES 9 AND 10

The experimental procedure was substantially the same as in Examples 8 to 13 except that the ultrasonic cleaning pre-treatment was conducted in ethyl alcohol instead of acetone and the aqueous coating solution containing sodium silicate having a $SiO_2$: $Na_2O$ molar ratio of 3.4 in a concentration of 40 g/liter calculated as $SiO_2$ was replaced with an aqueous solutions of potassium silicate having a $SiO_2$:$K_2O$ molar ratio of 3.4 in a concentration of 30 g/liter calculated as $SiO_2$. The length of time for the heat treatment was 20 minutes in each experiment excepting Comparative Example 9 in which the heat treatment was conducted at 30° C. for 40 minutes. The thickness of the thus formed vitrified potassium silicate-based protective coating film was 200 nm.

The thus prepared test specimens were each subjected to the accelerated weatherability test under the same conditions as in the preceding Examples and to the test of the decrease in the magnetic performance under the same conditions as in Examples 8 to 13 to give the results shown in Table 5 below. As is understood from the table, particularly excellent corrosion resistance can be obtained when the temperature of the heat treatment is 120° C. or higher while a decrease is caused in the magnetic performance of the magnet when the temperature is higher than 450° C.

TABLE 5

| | Temperature of heat treatment, °C. | Appearance after weatherability test | Decrease in magnetic property, % |
|---|---|---|---|
| Example | | | |
| 28 | 50 | B | 0.5 |
| 29 | 120 | A | 0.7 |
| 30 | 250 | A | 0.7 |
| 31 | 450 | A | 1.2 |
| Comparative Example | | | |
| 9 | 30 | C | 0.5 |
| 10 | 500 | A | 7.8 |

EXAMPLE 32 TO 37

The experimental procedure was substantially the same as in Examples 1 to 7 except that the aqueous coating solutions containing sodium silicate in a concentration of 30 g/liter calculated as $SiO_2$ were prepared by dissolving water glass having a $SiO_2$: $Na_2O$ molar ratio of 2.4 in water and further admixing the solution with finely divided silica particles having an average particle diameter of 12 nm, which were dispersed in the solution by the application of ultrasonic waves, in varied amounts indicated in Table 6 below. The thickness of the thus formed silica particle-containing vitrified sodium silicate-based protective coating films was as shown in the Table.

The thus prepared test specimens were each subjected to the accelerated weatherability test under the same conditions as in Examples 1 to 7 and to the test for the decrease in the adhesive bonding strength between the protective coating film and the substrate surface after the weatherability test under the same conditions as in Examples 17 to 22 to give the results shown in Table 6 below.

TABLE 6

| Example No. | Silica particles added, g/liter | Film thickness, nm | Appearance after weatherability test | Decrease in adhesive bonding, % |
|---|---|---|---|---|
| 32 | 0.5 | 150 | W | 37.8 |
| 33 | 1.0 | 160 | W | 25.8 |
| 34 | 1.5 | 180 | A | 13.4 |
| 35 | 5.0 | 250 | A | 9.5 |
| 36 | 10.0 | 700 | A | 9.2 |
| 37 | 15.0 | 1500 | B | 13.7 |

EXAMPLES 38 TO 42 AND COMPARATIVE EXAMPLES 11 AND 12

The experimental procedure was substantially the same as in Examples 1 to 7 except that the coating liquids, which were prepared by dissolving water glass having a $SiO_2$:$Na_2O$ molar ratio of 2.4 in varied concentrations of 1 to 250 g/liter as $SiO_2$ in water, were each admixed with the same finely divided silica particles as used in the preceding Examples in an amount of 5 g/liter. Table 7 below shows the thickness of the thus formed silica particle-containing vitrified sodium silicate-based protective coating films which were obtained by a single coating treatment excepting for Example 42 in which the coating procedure was repeated twice with a coating liquid in which the concentration of sodium silicate was 200 g/liter as calculated for $SiO_2$. The concentration of sodium silicate in the coating liquid used in Comparative Example 12 was 250 g/liter as calculated for $SiO_2$ so that the resulting protective coating film having a thickness of 12000 nm was not uniform.

The thus prepared test specimens were each subjected to the accelerated weatherability test under the same conditions as in the preceding Examples to give the results shown in Table 7.

TABLE 7

| | Concentration of sodium silicate as $SiO_2$, g/liter | Thickness of of coating film, nm | Appearance after weatherability test |
|---|---|---|---|
| Example | | | |
| 38 | 3 | 5 | B |
| 39 | 30 | 250 | A |
| 40 | 100 | 1600 | A |
| 41 | 200 | 4500 | A |
| 42 | 200 (× 2) | 10000 | A |
| Comparative Example | | | |
| 11 | 1 | <1 | C |
| 12 | 250 | 12000 | — |

EXAMPLES 43 TO 46 AND COMPARATIVE EXAMPLES 13 AND 14

The experimental procedure was substantially the same as in the preceding Examples except that the coating liquid was prepared by dissolving water glass having a $SiO_2$:$Na_2O$ molar ratio of 2.4 in a concentration of 30 g/liter as $SiO_2$ in water and further admixing the solution with 5 g/liter of the same finely divided silica particles used in the preceding Examples and the heat treatment was conducted at varied temperatures of 30° to 500° C. for 20 minutes excepting Comparative Example 13 in which the heat treatment was conducted at 30° C. for 40 minutes. The thus formed silica particle-containing vitrified sodium silicate-based protective coating films had a thickness of 250 nm.

The thus prepared test specimens were subjected to the accelerated weatherability test under the same conditions as in the preceding Examples and the test for the magnetic performance under the same conditions as in Examples 28 to 31 to give the results shown in Table 8.

TABLE 8

| | Temperature of heat treatment, °C. | Appearance after weatherability test | Decrease in magnetic property, % |
|---|---|---|---|
| Example | | | |
| 43 | 50 | B | 0.5 |
| 44 | 120 | A | 0.7 |
| 45 | 250 | A | 0.8 |
| 46 | 450 | A | 1.2 |

TABLE 8-continued

| | Temperature of heat treatment, °C. | Appearance after weatherability test | Decrease in magnetic property, % |
|---|---|---|---|
| Comparative Example | | | |
| 13 | 30 | C | 0.4 |
| 14 | 500 | A | 7.9 |

What is claimed is:

1. A method for the preparation of a highly corrosion-resistant rare earth-iron-boron permanent magnet which comprises the steps of:

(a) providing a sintered base body of a rare earth-iron-boron permanent magnet with an outer surface by alloying the rare earth-iron-boron elements and forming a block of permanent magnetic material;

(b) coating the surface of the base body of the rare earth-iron-boron permanent magnet with an aqueous coating liquid containing an alkali metal silicate having a chemical composition expressed by the formula $M_2O.nSiO_2$, in which M is an alkali metal element and n is a positive number in the range from 1.5 to 20, to form a coating layer;

(c) drying the coating layer to give a dried surface film; and (d) subjecting the dried surface film of alkali metal silicate to a heat treatment at a temperature in the range from 50° to 450° C. to form a vitrified alkali metal silicate-based coating film, the coating amount of the aqueous coating liquid containing an alkali metal silicate in step being such that the vitrified alkali metal silicate-based coating film formed has a thickness in the range from 100 nm to 3 $\mu$m.

2. The method for the preparation of a highly corrosion-resistant rare earth-iron-boron permanent magnet as claimed in claim 1 in which coating in step (b) is preceded by a cleaning treatment of the base body of a rare earth-iron-boron permanent magnet with application of ultrasonic waves.

3. The method for the preparation of a highly corrosion-resistant rare earth-iron-boron permanent magnet as claimed in claim 1 in which the alkali metal silicate is sodium silicate.

4. The method for the preparation of a highly corrosion-resistant rare earth-iron-boron permanent magnet as claimed in claim 1 in which the concentration of the alkali metal silicate in the aqueous coating liquid is in the range from 3 to 200 g/liter calculated as $SiO_2$.

5. The method for the preparation of a highly corrosion-resistant rare earth-iron-boron permanent magnet as claimed in claim 1 in which the temperature of the heat treatment in step (d) is in the range from 120° to 450° C.

6. The method for the preparation of a highly corrosion-resistant rare earth-iron-boron permanent magnet as claimed in claim 1 in which the value of n in the formula $M_2O.nSiO_2$ is in the range from 2.5 to 9.0.

7. The method for the preparation of a highly corrosion-resistant rare earth-iron-boron permanent magnet as claimed in claim 1 in which the heat treatment in step (d) is performed for a length of time in the range from 1 to 120 minutes.

8. The method for the preparation of a highly corrosion-resistant rare earth-iron-boron permanent magnet as claimed in claim 1 in which the aqueous coating liquid containing an alkali metal silicate in step (b) further contains finely divided silica particles having an average particle diameter in the range from 5 to 50 nm dispersed therein.

9. The method for the preparation of a highly corrosion-resistant are earth-iron-boron permanent magnet as claimed in claim 8 in which the amount of the finely divided silica particles dispersed in the aqueous coating liquid containing an alkali metal silicate is in the range from 2% to 50% based on the content of silicon dioxide in the alkali metal silicate.

* * * * *